United States Patent [19]

Kronogård et al.

[11] Patent Number: 4,616,482
[45] Date of Patent: Oct. 14, 1986

[54] TURBOCHARGING DEVICE FOR AN INTERNAL COMBUSTION ENGINE

[75] Inventors: Sven-Olof Kronogard, Lomma; Clas-Olof Kronogård, Gråbo; Håkan Kronogård, Lund, all of Sweden

[73] Assignee: AB Volvo, Sweden

[21] Appl. No.: 636,593

[22] Filed: Aug. 1, 1984

Related U.S. Application Data

[62] Division of Ser. No. 292,947, Aug. 14, 1981, Pat. No. 4,474,007.

[30] Foreign Application Priority Data

Sep. 29, 1980 [SE] Sweden .............................. 80068042

[51] Int. Cl.⁴ ............................................. F02B 37/00
[52] U.S. Cl. ........................................ 60/624; 60/605; 60/606
[58] Field of Search .......................... 60/605, 606, 624

[56] References Cited

U.S. PATENT DOCUMENTS

| | | | |
|---|---|---|---|
| 2,245,163 | 6/1941 | Smith | 60/624 X |
| 3,224,186 | 12/1965 | Wood | 60/624 X |
| 4,233,815 | 11/1980 | Melchior | 60/606 |

Primary Examiner—Michael Koczo
Assistant Examiner—Peggy A. Neils
Attorney, Agent, or Firm—Wegner & Bretschneider

[57] ABSTRACT

The turbocharging plant of an internal combustion engine includes two turbines connected in series, of which one drives the compressor and the other transfer its output to the engine mechanically. The turbines and the compressor are mounted at the same side of the engine. The turbines can be designed to handle the gas in a radially inwards directed flow, the downstream turbine being mounted at a lower level than the upstream one, and receiving the gas by way of a double volute device. A third turbine designed to handle the gas in a radially outwards directed flow may be interposed between the two first mentioned turbines.

3 Claims, 8 Drawing Figures

TURBOCHARGING DEVICE FOR AN INTERNAL COMBUSTION ENGINE

CROSS REFERENCE TO RELATED APPLICATION

This application is a division of co-pending application Ser. No. 292,947, filed Aug. 14, 1981, now U.S. Pat. No. 4,474,007.

BACKGROUND OF THE INVENTION

The present invention refers to the supercharging of internal combustion engines, especially engines intended for automotive purposes, where increasing demands upon reduction of weight and volume means that the available space will be restricted, but where the requirements concerning an easy servicing and substitution of components will be high.

The use of ceramic materials in the exhaust conduits, housings and turbine rotors make it possible to produce light and compact supercharging units.

The energy content will often exceed what is needed to supply the required amount of combustion air, and with a favourable design and location of the second turbine in series with the turbine driving the compressor the engine output can be augmented.

SUMMARY OF THE INVENTION

A turbocharging device according to the invention is characterized in that a first turbine drives the compressor, while a second turbine is drivingly connected to the engine. The first turbine and the compressor are advantageously mounted with their axes perpendicularly to the crank shaft of the engine, while the second turbine is mounted with its shaft in parallel to the crank shaft.

The two turbines may be designed to handle the motive gas in a radially inwards direction and can then be mounted with their shafts horizontally, and on the same side of the engine. The second turbine is mounted lower than the first turbine, and a double volute transfers gas from the first to the second turbine.

A third turbine, designed to handle gas in a radially outwards directed flow may be interposed between the two first mentioned turbines, directly downstream of the first turbine.

The output shafts of the second and third turbines may be interconnected by a gearing coupled to the output shaft from the engine, and in one embodiment also optionally to the compressor.

BRIEF DESCRIPTION OF THE DRAWINGS

FIG. 1 shows a turbocharged engine 10 where the exhaust and air conduits 13, 12 are connected to a housing 11, which encloses the rotor spool of the turbocharger (not shown). The air inlet is denoted by 15 and a second exhaust gas turbine 40 having a horizontal shaft 41, is fitted at the exhaust conduit 14.

Figure 1:
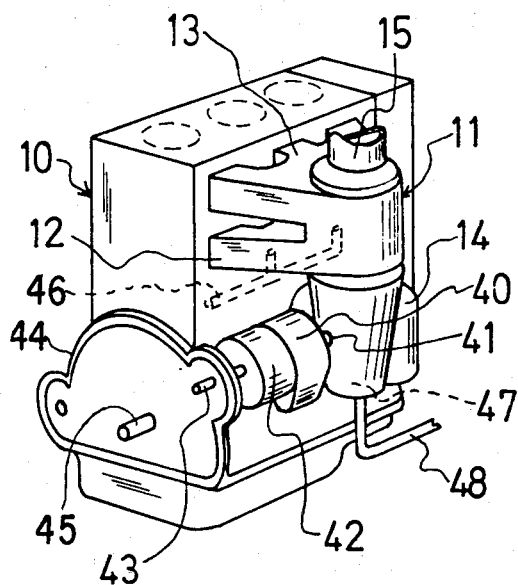
FIG. 1 shows a supercharged internal combustion engine having a second exhaust gas turbine adapted to drive at the fly-wheel of the engine.

The air conduits and the exhaust conduits are preferably formed into an integral housing, which possibly may be divided in a plane perpendicularly to the rotor axis. In the latter case there will be one first half to which the air conduits are connected, and a second half to which the exhaust conduits are connected. The housing encloses a cylindrical chamber, into which a turbocharger rotor casing may be slid from above, to rest upon suitable support in the lower part of the housing, or upon a flange at the upper end thereof. The rotor casing is provided with suitable guide vanes and/or passages, which fit against corresponding passages in the wall defining the cavity.

A turbocharger unit conventionally comprises a rotor spool including a turbine wheel and a compressor wheel, which are mounted upon a common shaft.

A two-stage gearing 42 and a free-wheel (not shown) connect the turbine shaft 41 with the power output shaft 43 from the engine, which extends into the casing 44, partly enclosing the fly-wheel (not shown) of the engine. A gear or belt transmission, possibly of a variable type, may be used to transfer surplus energy in the exhaust gases to the output shaft 45.

The power of the supercharger turbine 17 may be increased by supplying fuel to the exhaust conduit 12. The exhaust gases will usually contain a sufficient amount of oxygen to support further combustion, and in the high temperature of the gases a rapid gasifying and ignition of injected fuel will occur.

Gaseous or liquid fuel is easily used, but it will be possible to operate with solid fuel, possibly suspended in a liquid or transferred into a gel. The injection device may be of the type common with burners, and is in the drawing indicated by a conduit 46.

In a similar manner it will be possible, alternatively, or in combination with the auxiliary burner described above, to supply additional fuel to the second exhaust gas turbine 40.

Figure 2:
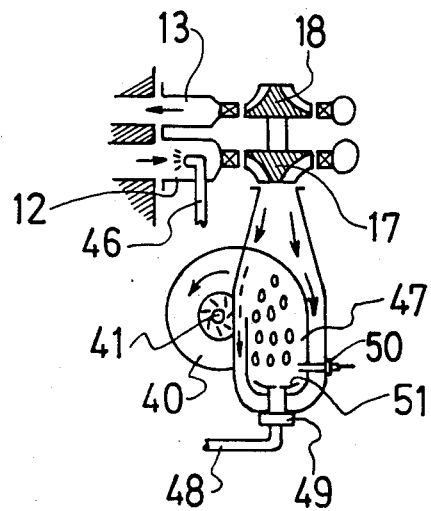
FIG. 2 shows, on a slightly larger scale, a combustor arrangement between the turbocharger unit and the second gas turbine of FIG. 1.

FIG. 2 shows, more in detail, a combustor 47 arranged in conjunction to the exhaust end of the housing 11. The combustor is arranged for reversed flow, which will provide for an increased length of the flame and will promote the gasifying of the fuel supplied by way of a conduit 48 to a burner 49 fitted at the lower end of the combustor and being provided with swirler means. The combustor is preferably formed with a conical inlet diffusor, which brings about a reduction of the gas velocity. Ignition is ensured by means of a spark plug 50, possibly in conjunction with a flame-holder 51.

Figure 3:
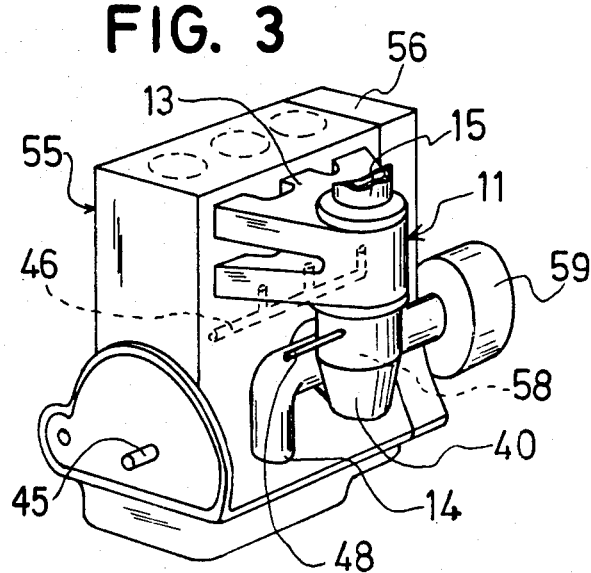
FIG. 3 shows a three-cylinder engine having a supercharging unit and a second gas turbine driving an auxiliary.

FIG. 3 shows a three-cylinder engine 55 provided with a supercharger mounted in a housing 11, of the same type as described above. A casing 56 encloses transmissions to associated auxiliaries. A second exhaust gas turbine 40 is also here connected to the exhaust conduit 14 from the housing 11, and may be used for driving an electric generator, or an hydraulic pump for loading an accumulator, for instance of the fly-wheel type 59, which is often used for hybrid power installations.

Figure 4:
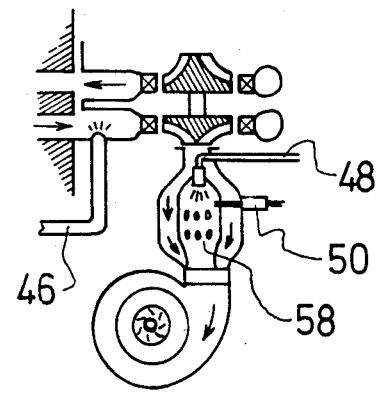
FIG. 4 shows, on a slightly larger scale, the combustor arrangement between the turbocharging unit and the second exhaust gas turbine of FIG. 3.

A pipe 46 for supplying fuel to the exhaust conduit 14 is also provided. A combustor 58 (see also FIG. 4) supplied with fuel through a pipe 48 is fitted in the exhaust conduit from the turbocharger housing 11.

The turbocharger turbine 17 and the second exhaust gas turbine 40 can be provided with adjustable guide vanes and/or a by-pass arrangement for improving the efficiency or increasing the power output, and for providing a high degree of flexibility. Turbochargers of the turbine type are usually the most convenient ones, but it will be possible to use rotors of the dispacement type, for instance with radial wings.

Figure 5:
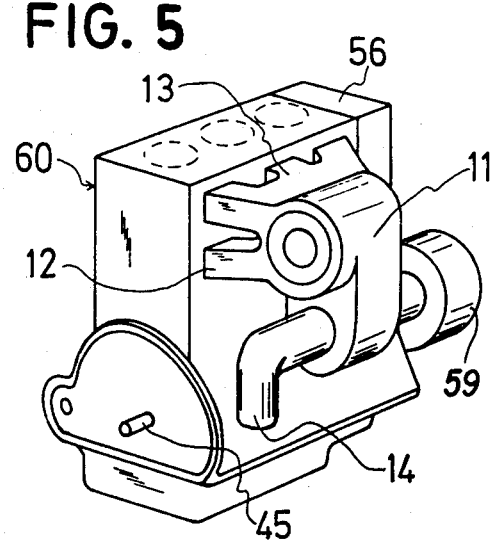
FIG. 5 shows an engine corresponding to that of FIG. 3, but with the shafts of the rotors arranged horizontally.

FIG. 5 shows an engine 60 of the same type as in FIG. 3 and having a turbocharger unit 61, 62 and a second exhaust gas turbine 63, which here are arranged with their shafts horizontally. Wherever applicable the same reference numerals as in FIG. 3 are used.

Figure 6:
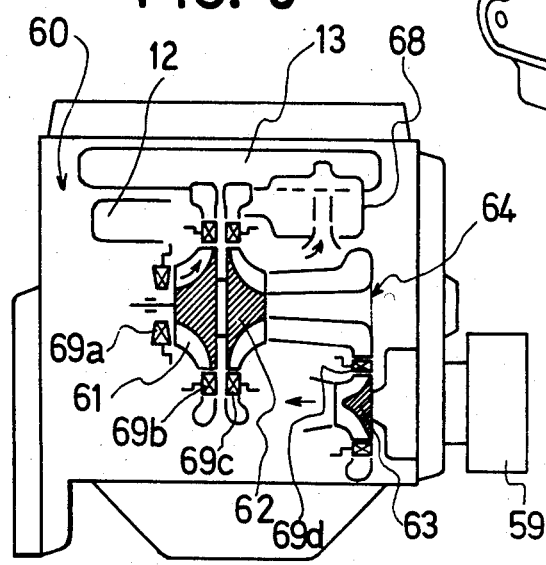
FIG. 6 shows schematically a cross section through the turbocharger unit of FIG. 5.

The design of the turbocharger unit is evident from FIG. 6. The compressor 61 and the turbine 62 driving the same are both of the radial type, where the latter is adapted to receive the gas in an inwardly directed flow. The second gas turbine 63 is of a similar design.

Figure 7:
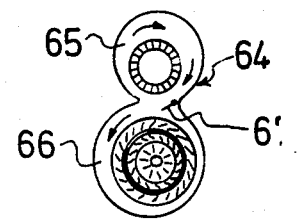
FIG. 7 shows a double volute for transferring gas from the turbocharger turbine to the second exhaust turbine.

The exhaust from the turbocharger turbine 62 passes by way of an axial passage and a double volute 64—see FIG. 7—to the second gas turbine 63. The chambers 65 and 66 of the double volute are designed so a smooth gas flow and a natural diffusor action are obtained.

Either or both internal walls are at the merging of one chamber into the other provided with an swingable lip 67, which permits adjustment of the size of the flow passage.

A combustor 68 is provided in the exhaust conduit 14 upstream of the turbocharger turbine 62 to augment the power thereof. The compressor 61 may be provided with adjustable inlet and outlet vanes 69a, b, and both turbines 62 and 63 are provided with inlet guide vanes 69d, c.

Figure 8:
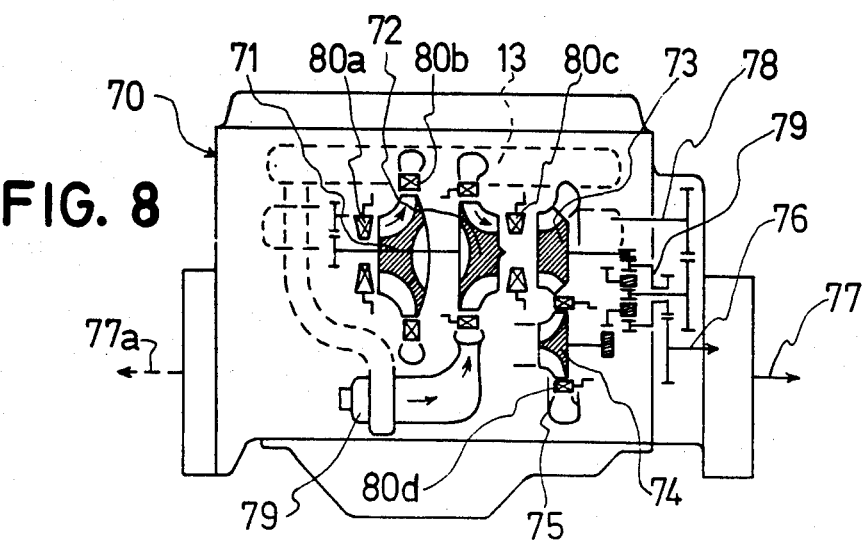
FIG. 8 shows a modified arrangement of the rotor unit.

FIG. 8 shows a development of the plant according to FIG. 6.

The engine 70 is of the same type as described above, and is provided with an air compressor 71, which is driven by a first exhaust gas turbine rotor 72. There are further a second and a third turbine rotors 73 and 74, respectively, arranged in series downstream of the first rotor. The turbine rotors 73 and 74 are located in the same vertical plane and the transfer of gas from the former to the latter occurs by way of a double volute 75 of the same kind as the one shown in FIG. 7.

A planetary gearing 76 interconnects the shafts of the two turbine rotors 73 and 74. The output shaft 76 of the gearing may be used for driving auxiliaries, or may be connected to the power take-off shaft 77. The engine is further provided with an alternative power-take off shaft 77a, indicated in broken lines.

An auxiliary shaft 78 makes it possible to transfer power both ways between the shaft mounting the compressor 71, and the first turbine rotor 72, and the gearing. A combustor 79 is fitted in the exhaust conduit 13, upstream of the first turbine rotor 72. Adjustable guide vanes 80a, b, c, d are provided at the inlet to the compressor and at the inlets to all turbine rotors.

When the exhaust conduits, the combustor and the turbines are mainly manufactured of ceramic material, the service life of these components will be long and they will last as long as the engine. Rotors journalled in air bearings do not require much maintenance.

The ceramic materials have a specific gravity of about one third of that of steel, which will result in very light designs. Due to the high specific power obtainable, the engine plant will require small space. The exhaust gas turbines will be about half as big as those of present day's installations.

With Otto-engines a knock-control device is preferably provided, which senses possible variations in the top pressure in the cylinder and actuates a valve in a by-pass conduit. The engine may then be operated with a high BMEP without any tendency to knocking. This offers an opportunity for automatic adaptation to fuels of different octane-numbers and/or qualities.

Water injections may also be used and in order to obtain a favourable intermixing the water is preferably supplied through a nozzle upstream of the compressor of the turbocharger.

Turbine rotors of ceramic material are well suited to cope with exhaust gases obtained by burning solid fuel, such as powdered coal.

The invention is not limited to the embodiments shown, but the shape and the location of associated components may be varied in many ways within the scope of the appendid claims. It is implied that the second turbine could very well receive the exhaust from two or more first turbines at the same engine.

What we claim is:

1. A turbocharging device for an internal combustion engine comprising:
   (A) a first turbine supplied with exhaust gas from said engine and having an output shaft driving a compressor feeding combustion air to said engine, said first turbine and said compressor being mounted with their shafts vertically and perpendicularly disposed to the crank shaft of said engine;
   (B) a second turbine mounted with its shaft parallel to said crank shaft and supplied with gas exhausted from said first turbine and having an output shaft drivingly connected to said engine, and
   (C) means to supply additional fuel to the passage between said first and said second turbine.

2. A turbocharging device according to claim 1 in which the means for supplying additional fuel comprises a combustor aligned with the outlet of said first gas turbine and designed for reversed gas flow, said combustor having a fuel burner connected at its end remote from said first turbine.

3. A turbocharging device according to claim 2 wherein said combustor is formed with a conical inlet diffuser, thereby bringing about a reduction of the gas velocity.

* * * * *